UNITED STATES PATENT OFFICE.

JOSEPH C. W. FRAZER, OF BALTIMORE, MARYLAND, ARTHUR B. LAMB, OF WASHINGTON, DISTRICT OF COLUMBIA, AND DAVID R. MERRILL, OF NEWARK, NEW JERSEY.

PROCESS OF TREATING GASES.

1,418,246.  Specification of Letters Patent. Patented May 30, 1922.

No Drawing. Application filed February 12, 1919. Serial No. 276,635.

*To all whom it may concern:*

Be it known that we, JOSEPH C. W. FRAZER, ARTHUR B. LAMB, and DAVID R. MERRILL, citizens of the United States, and residing at Baltimore, Maryland, Washington, District of Columbia, and Newark, New Jersey, respectively, have invented certain new and useful Improvements in Processes of Treating Gases, of which the following is a specification.

The present invention relates to processes of purification of gases by removal therefrom of oxidizable constituents and more specifically to processes wherein the oxidizable constituents are combined with oxygen to produce compounds which are innoxious, or which may be condensed or dissolved, or combined chemically with suitable reagents and thus removed from the reaction products.

This process comprises the catalytic removal of catalytic poisons from gases which are subsequently subjected to the action of catalysts. In this way the danger of poisoning or destroying the efficiency of catalysts is removed or substantially avoided.

The invention comprises the passing of the gases through a sorbent oxidizing catalyst at a low temperature, the gases being previously mixed with the necessary quantity of air or oxygen when the amount of impurities is large and when the amount is small, being without such admixture.

Among the objects of the invention is the removal of oxidizable gases such as carbon monoxide from other oxidizable gases, such as hydrogen in such gases as water gas or other gas mixtures and the removal of such impurities as arsine and phosphine from gases such as acetylene, ammonia, or the like, to produce respectively, pure hydrogen, acetylene, ammonia, etc., and to accomplish such removal at low temperatures. In other words, it might be said that one of the objects of the invention is to provide a process whereby combustible mixtures may be freed by selective oxidation of certain of the constituents.

It has been found that certain compounds or mixtures containing same when prepared in suitable condition have the property of oxidizing most oxidizable gases and vapors at low temperatures, in certain instances, as low as room temperature and lower. When operating at room temperatures the gases are usually first dried. Such compounds are copper oxide, basic copper carbonate, mixtures of copper oxide and manganese dioxide, of copper oxide and cobalt oxide, of manganese dioxide and ferric oxide, and others. It may be stated as a general rule that a mixture of metallic oxides consisting of two or more oxides, one being polyvalent and the other mono- or di-valent, will produce the desired oxidation, when properly prepared. The catalysts are active from the start even when operating at low temperatures. In other words when the gases are brought in contact with the catalysts the oxidation begins at once.

The choice of the material to be used in any particular oxidation depends on the ease with which the oxidation takes place at the desired temperature, and the temperature at which the oxidation will take place will depend upon the quantity of the impurities in the gas and, to some extent, the humidity of the mixture.

The catalysts are prepared in the manner set out in the Patent No. 1,345,323, dated June 29, 1920, by J. C. W. Frazer and C. C. Scalione. These methods of preparation involve the initial preparation of the material in a very finely divided state, preferably by precipitation, substantially complete removal of the impurities, such as the excess of precipitant, collection of the material, thorough kneading in order to very intimately mix the constituents, formation into a more or less dense cake, and drying of the cake at low temperatures.

Specific examples of the preparation of a copper oxide catalyst and one composed of copper oxide or carbonate and manganese dioxide are as follows:

Example 1: Copper oxide.

Copper oxide is prepared from copper sulfate and sodium hydroxide by rapidly mixing these two reagents in hot concentrated solutions in order to produce a very finely divided precipitate. This precipitate is then thoroughly washed by decantation, collected on a filter, thoroughly kneaded, compressed if desired, and dried at 120 to 130° C. The resultant cake is then crushed to a suitable size and is then ready for use.

In using this copper oxide catalyst for the elimination of arsine and phosphine from acetylene or ammonia the gas mixture is passed over or through the catalyst, along with sufficient oxygen to combine with the arsine and phosphine, at a temperature not exceeding 50° C. The two impurities will be completely removed from the acetylene or ammonia.

Example 2: Copper manganese.

Copper oxide or carbonate prepared as in Example 1, is mixed, preferably before drying, with thoroughly washed manganese dioxide prepared by the interaction of potassium permanganate and manganese sulfate in strong surfuric acid and subsequent dilution, is collected on a filter, thoroughly kneaded, submitted to compression, if desired, dried at a low temperature, and ground or crushed to a suitable size. It is then ready for use.

In using this material for the separation of carbon monoxide from hydrogen, for example, the impure hydrogen is mixed with sufficient oxygen to combine with the carbon monoxide present and provide a slight excess and the mixture after being dried is passed over or through the catalyst at room temperature. The carbon monoxide will be completely oxidized with no appreciable action on the hydrogen.

In case the impure hydrogen contains much water vapor or if it is not suitable to dry the gases before treatment, the temperature of the catalyst may be raised to 75 to 110° C., with complete removal of the carbon monoxide without appreciable quantities of the hydrogen being lost.

Other mixtures such as ferric oxide, manganese dioxide, bismuthic oxide, and copper oxide may be used if properly prepared as indicated.

In using the material prepared in the manner indicated for the removal of small quantities of arsine and phosphine from gases, it is not necessary to add to the gas under treatment the amount of oxygen necessary to oxidize these impurities, as the material is a sufficiently active oxidizing agent to accomplish the oxidation at ordinary temperatures by means of the oxygen combined therein. Of course, in such cases the material is not catalytic in the ordinary meaning of the term.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

1. The process of removing CO from gases containing H which comprises causing the CO to combine with added O in the presence of a solid catalyst at a temperature below 100° C.

2. The process of treating gases containing H and CO which comprises causing the CO to combine with added O in the presence of a metallic oxide as catalyst at a temperature below 100° C.

3. The process of removing CO from gases containing H which comprises causing the CO to combine with added O in the presence of a solid catalyst and a promotor at a temperature below 100° C.

4. The process of removing CO from gases containing H which comprises causing the CO to combine with added O in the presence of a mixture of iron oxide with another metallic oxide as catalyst at a temperature below 100° C.

5. The process of removing from an oxidizable gas impurities that are more readily oxidized which comprises passing the gas into contact with a catalyst at temperatures below 100° C. and causing oxidation of the impurities without substantial oxidation of the oxidizable gas.

6. The process of removing from an oxidizable gas impurities that are more readily oxidized which comprises passing the gas into contact with a catalyst at ordinary room temperatures and causing oxidation of the impurities without substantial oxidation of the oxidizable gas.

7. The process of removing oxidizable impurities from H which comprises passing the H into contact with a catalyst at temperatures below 100° C. and causing oxidation of the impurities without substantial oxidation of the H.

8. The process of removing oxidizable impurities from H which comprises passing the H into contact with a catalyst at ordinary room temperatures and causing oxidation of the impurities without substantial oxidation of the H.

9. The process of removing from an oxidizable gas impurities that are more readily oxidized which comprises passing the gas in admixture with sufficient gas comprising free oxygen to oxidize the impurities into contact with a sorbent catalyst at temperatures below 100° C., and causing oxidation of the impurities without substantial oxidation of the oxidizable gas.

10. The process of removing from an oxidizable gas impurities that are more readily oxidized which comprises passing the gas in admixture with sufficient gas comprising free oxygen to oxidize the impurities, into contact with a sorbent catalyst at ordinary room temperatures and causing oxidation of the impurities without substantial oxidation of the oxidizable gas.

11. The process of removing oxidizable impurities from H which comprises passing the H admixed with sufficient gas comprising free oxygen to oxidize the impurities, into contact with a catalyst at temperatures below 100° C., and causing oxidation of the impurities without substantial oxidation of the H.

12. The process of separating from oxidizable gases impurities that are more readily oxidized which comprises bringing about at temperatures below 100° C., the selective oxidation of the impurities by means of a catalyst composed of one or more metal oxides in extremely finely divided condition.

13. The process of separating from oxidizable gases impurities that are more readily oxidized which comprises bringing about at ordinary room temperatures the selective oxidation of the impurities by means of a catalyst composed of one or more metal oxides in extremely finely divided condition.

14. The process of purifying H which comprises oxidizing the impurities in the presence of an oxidizing catalyst at temperatures below 100° C.

15. The process of removing CO from gases or mixtures of gases which comprises passing the gas or mixture of gases into contact with a catalyst below 100° C. and causing selective oxidation of the CO.

16. The process of removing CO from gases or mixtures of gases which comprises passing the gas or mixture of gases in admixture with sufficient gas comprising free oxygen to oxidize the CO into contact with a catalyst at temperatures below 100° C. and causing selective oxidation of the CO.

17. The process of removing CO from gases or mixtures of gases which comprises passing the gas or mixture of gases in admixture with sufficient gas comprising free oxygen to oxidize the CO into contact with a catalyst at ordinary room temperatures and causing selective oxidation of the CO.

18. In a process of removing from gases catalytic poisons that are more readily oxidized, subjecting said gases to the action of catalysts at ordinary room temperatures.

19. In a process of removing from gases catalytic poisons that are more readily oxidized, subjecting said gases to the action of catalysts at temperatures below 100° C.

20. In a process of catalytically removing from gases catalytic poisons that are more readily oxidized, effecting at temperatures below 100° C. selective oxidation of said poisons by means of a catalyst composed of one or more metal oxides in extremely finely divided condition.

21. In a process of catalytically removing from gases catalytic poisons that are more readily oxidized, effecting at ordinary room temperatures selective oxidation of said poisons by means of a catalyst composed of one or more metal oxides in extremely finely divided condition.

JOSEPH C. W. FRAZER.
ARTHUR B. LAMB.
DAVID R. MERRILL.